United States Patent

Mansur

[19]

[11] Patent Number: 5,907,887
[45] Date of Patent: Jun. 1, 1999

[54] FLOOR WASHING APPARATUS

[75] Inventor: Pierre G. Mansur, Miami, Fla.

[73] Assignee: Mansur Industries Inc., Miami, Fla.

[21] Appl. No.: 08/964,980

[22] Filed: Nov. 5, 1997

Related U.S. Application Data

[60] Provisional application No. 60/030,448, Nov. 6, 1996.

[51] Int. Cl.[6] .................................................... A47L 7/02
[52] U.S. Cl. .............................................. 15/320; 15/353
[58] Field of Search ....................................... 15/320, 321

[56] References Cited

U.S. PATENT DOCUMENTS

| | | | |
|---|---|---|---|
| 3,775,053 | 11/1973 | Wisdom | 15/320 X |
| 3,815,169 | 6/1974 | Mooring | 15/321 |
| 4,377,017 | 3/1983 | Herpers et al. | 15/320 |
| 4,466,155 | 8/1984 | Grave | 15/321 |
| 5,331,713 | 7/1994 | Tipton | 15/320 |

*Primary Examiner*—Chris K. Moore
*Attorney, Agent, or Firm*—Robert M. Downey, PA

[57] ABSTRACT

A floor washing apparatus for removing oil, grease and other residue contaminants from a floor surface includes a housing supported on wheels and a spray suction head removably attachable to the housing so that a suction intake mouth is maintained in close spaced relation above the floor surface as the apparatus as moved on the floor. A wash tank within the housing holds a predetermined charge of wash solution and includes a pump therein to discharge a forced flow of the cleaning solution through one or more nozzles in the spray suction head and onto the floor surface, and a vacuum suction motor for creating a negative pressure within the wash tank to draw the wash solution and contaminant residues removed from the floor surface through the suction intake mouth and an interconnecting flexible hose for return to the wash tank. During a recycling process, a valve assembly releases contaminated wash solution from the wash tank into a distillation chamber where the wash solution is heated to produce vapors. A condenser cools the vapors to a liquid state, yielding non-contaminated, pure wash solution which is directed into a holding tank for subsequent transfer and use in the wash tank.

17 Claims, 1 Drawing Sheet

FLOOR WASHING APPARATUS

This application claims benefits of provisional application 60/030,448 filed Nov. 6, 1996.

BACKGROUND OF THE INVENTION

1. Field of the Invention

This invention relates to an apparatus for washing floors, and more particularly, to a floor washing apparatus structured to discharge and pick up a wash solution in order to remove oil, grease and other contaminant residues from a floor surface, and wherein the apparatus includes means for recycling contaminated, dirty wash solution during a recycling process to produce non-contaminated, pure wash solution for subsequent use during floor washing operations.

2. Description of the Related Art

During the normal day to day operations at various industrial and/or commercial facilities, the floor or ground surface usually becomes contaminated with various residues such as oil and grease. For instance, at an automotive repair facility, oil, grease and other contaminants may drip from vehicles and other equipment onto the floor surface below. At the end of the day, there is often a slippery sheen of residue over much of the garage floor surface presenting both a safety and environmental hazard. To prevent slipping and further contamination, garage floor surfaces are, in most instances, washed regularly with a hose or water pressure cleaner to remove the undesirous film of residue. While this is generally effective to improve safety conditions, the run-off from such washing operations results in large volumes of contaminated water which must be directed to an on site separation reservoir to separate some of the oils and other contaminants from the water used to wash the floor surface. Thereafter, the separated contaminants need to be pumped out of the separation reservoir for transport to a remote contaminant disposal facility. This process of separation and removal of contaminants from the wash run-off is both time consuming and costly to the business owner, requiring a private disposal service to regularly clean out the separation reservoir. Further, the process is not entirely effective in removing contaminants from the floor surface or separation reservoir.

Accordingly, there is an urgent need in virtually all industrial/commercial environments, and some households, for an apparatus structured to remove contaminants such as oil and grease from floor surfaces in a highly efficient, cost-effective manner which does not require the use of a contaminant disposal service for transport of contaminants to a remote disposal site.

SUMMARY OF THE INVENTION

A floor washing apparatus for removing oil, grease and other residue contaminants from a floor surface includes a housing supported on wheels, and a spray suction head removably attachable to the housing so that a suction intake mouth is maintained in close spaced relation above the floor surface. A wash tank within the housing holds a predetermined charge of wash solution and includes a pump therein to discharge a forced flow of the cleaning solution through one or more nozzles in the spray suction head and onto the floor surface. A vacuum suction motor for creating a negative pressure within the wash tank draws the wash solution and contaminant residues through the suction intake mouth as the apparatus is wheeled across the floor or ground surface. A flexible hose interconnects between the spray suction head and the wash tank for returning the solution and contaminants picked by the intake mouth to the wash tank. During a recycling process, a valve assembly releases contaminated wash solution from the wash tank into a distillation chamber where the wash solution is heated to produce vapors. A condenser cools the vapors to a liquid state, yielding non-contaminated, pure wash solution which is directed into a holding tank for subsequent transfer and use in the wash tank.

Accordingly, with the foregoing in mind, it is a primary object of the present invention to provide a floor washing apparatus for removing oil, grease, and other residue contaminants from a floor surface using a wash solution, and wherein the apparatus includes means for recovering the used wash solution and contaminants removed from the floor surface and means for integrated recycling of the wash solution to provide non-contaminated, pure wash solution for subsequent use during floor washing operations.

It is another object of the present invention to provide a floor washing apparatus which is relatively compact and easy to operate.

It is a further object of the present invention to provide a floor washing apparatus for removing oil, grease, and other residue contaminants from a floor surface and which includes a spray suction head interconnected to a wash tank of the apparatus via a flexible hose, wherein the spray suction head can be removed from a housing of the apparatus to reach floor surface areas which might otherwise be difficult to access.

It is still a further object of the present invention to provide a floor washing apparatus, as described above, which eliminates the need for inconvenient and costly disposal of contaminated wash solution.

It is still a further object of the present invention to provide a floor washing apparatus for removing oil, grease, and other residue contaminants with a wash solution, wherein the apparatus includes means for integrated recycling of the wash solution to yield pure, non-contaminated wash solution for future use, thereby eliminating the need for pick up and transport of large volumes of contaminated wash solution for disposal at remote treatment facilities.

These and other objects and advantages of the present invention are more readily apparent with reference to the detailed description and drawings.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
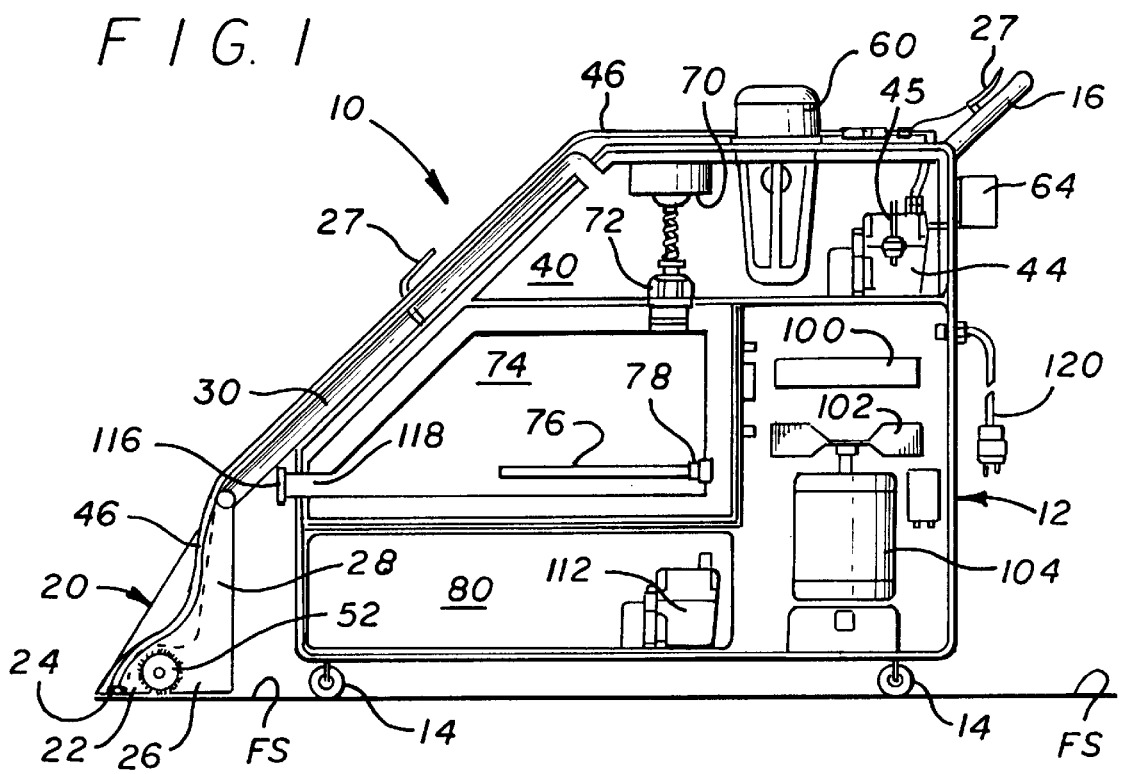
FIG. 1 is a side elevation, in partial section, illustrating the structure and arrangement of component elements of the apparatus.
Figure 2:
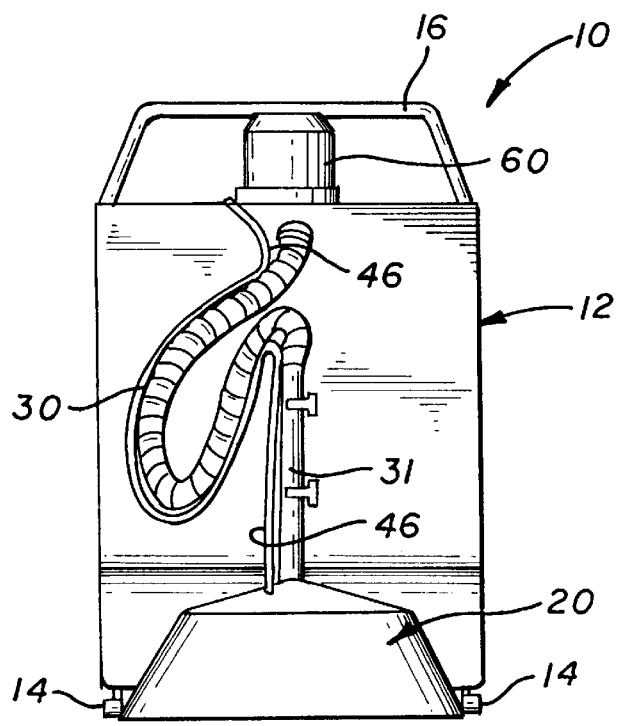
FIG. 2 is a front elevation of the apparatus illustrating attachment of a spray suction head and hose to a housing of the apparatus.

Referring to FIGS. 1 and 2 of the drawings, there is generally illustrated the floor washing apparatus 10 of the present invention. The apparatus 10 includes a housing 12 for containing the various components of the apparatus therein. In a preferred embodiment, the housing 12 is a molded plastic shell structure. The housing 12 is supported on wheels, rollers or casters 14 which, along with a handle 16, facilitate manually assisted movement of the apparatus 10 across a floor surface FS.

A spray suction head 20 includes an open bottom end 22 which is normally maintained in close, spaced relation to the floor surface FS during washing operations. At least one, and preferably a plurality of spray nozzles or jets 24 are provided near the open end of the spray suction head 20. A suction intake mouth 26 is further provided at the open end 22 of the spray suction head 20 and communicates with a vacuum suction tunnel 28. A flexible hose 30 interconnects at one end to the spray suction head, at the top of the vacuum suction tunnel. The hose 30 may include a rigid section 31 near the spray suction head 20, as seen in FIG. 2. An opposite end of the flexible hose 30 connects to a wash tank 40 within the housing, providing a fluid communication between the suction intake mouth 26 and the wash tank 40. The hose 30 and spray suction head 20 are removably attached to the housing 12 using clips 32 and other suitable attachment hardware.

A predetermined charge of wash solution is contained within the wash tank 40. During washing operations, a pump 44 in the wash tank 40, delivers a forced flood of wash solution through a flexible conduit 46 to the nozzles 24 in the spray suction head 20 so that wash solution is sprayed against the floor surface FS at a sufficient pressure to loosen contaminants on the floor surface, thereby promoting pick up through the suction intake mouth 26. Triggers 27 can be provided on both the handle 16 and the hose 30 to actuate corresponding valves within the flexible conduit 46 in order to control release of the wash solution from the nozzles 24. A float switch 45 disables the wash tank pump 44 if the level of wash solution in the wash tank 40 drops below a predetermined level, thereby preventing damage to the wash tank pump 44. A brush 52 may be provided at the open end 22 of the spray suction head, adjacent the suction intake mouth 26, to further promote separation of contaminants from the floor surface and pick up through the suction intake mouth. The brush 52 is preferably of a cylindrical configuration and may be either manually rotated upon engagement and movement along the floor surface FS or, alternatively, the brush may be drivingly rotated by either a motor in the spray suction head 20 or by the force of wash solution flow exiting the flexible conduit 46.

A vacuum suction motor 60 creates a negative pressure in the wash tank 40, during normal washing operations, to create suction at the suction intake mouth 26, causing previously discharged wash solution and contaminants on the floor surface to be sucked through the flexible hose 30 and deposited within the wash tank 40.

A rechargeable soap dispenser 64 periodically releases a predetermined charge of cleaning agent or detergent into the wash tank 40, for mixture with the solution contained therein. Normally release of the cleaning agent from the soap dispenser 64 is triggered upon transfer of purified solution from a holding tank 80 (as described hereinafter) to the wash tank 40.

Once the wash solution in the wash tank becomes substantially contaminated from washing operations, a recycling process is initiated by activation of pneumatic cylinder assembly 70 which opens a transfer valve assembly 72, causing the contaminated wash solution to be dumped into an insulated distillation tank 74. After all contaminated solution has been transferred into the distillation tank 74, the transfer valve assembly 72 is closed by the pneumatic cylinder assembly 70. Cartridge heaters 76 within the distillation tank 74 are activated to heat the contaminated cleaning solution to a temperature sufficient to produce vapors for distillation. Heat sensors 78 are provided to sense a change in temperature of the heating elements 76, after all of the wash solution has been vaporized, so that the heating elements 76 can be then turned off.

A condenser 100 is positioned and disposed within a cooling zone and is cooled by a fan 102 driven by a vacuum pump motor assembly 104 which creates a vacuum in the distillation tank 74 during the distillation process. The vapors created in the distillation tank, during the distillation process, are directed through the condenser 100, wherein the vapors are condensed to yield fresh, non-contaminated wash solution. The distilled, purified wash solution is directed into a lower holding tank 80 for storage therein. A pump 112 in the holding tank 80 transfers the pure cleaning solution to the wash tank after contaminated solution in the wash tank has been released into the distillation tank and the transfer valve assembly has been closed. Subsequent floor washing operations are then performed using the pure, non-contaminated wash solution which may include a soap detergent or other agent dispensed from the rechargeable soap dispenser 64.

A removable cap, cover or shutter 116 is provided on the exterior of the housing 12 to facilitate direct access to the distillation tank 74 through a port or opening 118 so that the contaminants which remain therein, after the distillation process, can be removed. The floor or bottom of the distillation tank 74 can be sloped towards the opening 118 to promote removal of the contaminants and cleaning of the distillation tank.

An electrical cord and plug 120 is provided for interconnection with an electrical outlet in order to supply power to the various components of the apparatus 10. The apparatus 10 may also be provided with a rechargeable battery (not shown), contained within the housing, for powering the components which operate during the normal floor washing operations, including the vacuum suction motor 60, the wash tank pump 44, the rechargeable soap dispenser 64 and, possibly, the rotating brush 52. An on/off switch (not shown) may be provided to control actuation of the floor washing components. To begin the recycling process, the electric cord 120 is plugged into a standard three prong outlet to provide power to the pneumatic cylinder 70, the vacuum pump motor 104, the heaters 76, sensors 78 and the transfer pump 112. A switch may be provided to initiate activation of these components to begin the recycling process.

While the instant invention has been shown and described in what is considered to be a preferred and practical embodiment thereof, it is recognized that departures may be made in the combination and configuration of components of the invention which, therefore, should not be limited except within the spirit and contemplated scope of the invention.

What is claimed is:

1. An apparatus for washing floor surfaces with a cleaning solution to remove contaminant substances therefrom, said apparatus comprising:

a housing including an exterior shell structure surrounding an interior of said housing;

a suction head including an open mouth structured and disposed to be placed in spaced, opposing relation to the floor surfaces during operation of said apparatus to wash the floor surfaces and including suction intake means for removing the cleaning solution from the floor surfaces;

at least one spray nozzle positioned at said open mouth of said suction head for directing a forced discharge of the cleaning solution onto the floor surfaces;

a wash tank for containing a predetermined charge of the cleaning solution therein;

a supply conduit interconnected in fluid flow communication between said at least one spray nozzle and said wash tank;

means for pressurized delivery of said predetermined charge of the cleaning solution through said flexible supply conduit and to said at least one spray nozzle for forced discharge therefrom;

a return hose interconnected in fluid flow communication between said suction intake means at said open mouth and said wash tank;

means for creating negative pressure at said open mouth to draw the cleaning solution and contaminant substances off of the floor surface and through said suction intake means and said return hose for delivery to said wash tank; and a distillation chamber in fluid flow communication with said wash tank, said distillation chamber being structured and disposed to receive said predetermined charge of the cleaning solution from said wash tank for recycling thereof and including means for distilling said predetermined charge of the cleaning solution in order to separate and remove the contaminant substances therefrom.

2. An apparatus as recited in claim 1 wherein said means for distilling said predetermined charge of the cleaning solution in said distillation chamber includes means for heating said predetermined charge of the cleaning solution to a temperature sufficient to cause vaporization of the cleaning solution, thereby producing vapors and causing separation of said contaminant substances from the cleaning solution.

3. An apparatus as recited in claim 2 wherein said means for distilling said predetermined charge of the cleaning solution further includes condenser means for condensing the cleaning solution vapors in order to yield purified, non-contaminated cleaning solution.

4. An apparatus as recited in claim 3 wherein said means for distilling said predetermined charge of the cleaning solution further includes vacuum means for creating a negative pressure within said distillation chamber to lower the temperature at which the cleaning solution vaporizes.

5. An apparatus as recited in claim 3 further including a recycled solution holding tank for receiving the purified, non-contaminated cleaning solution from said condenser means.

6. An apparatus as recited in claim 5 further including means for selectively transferring the purified, non-contaminated cleaning solution from said recycled solution holding tank to said wash tank.

7. An apparatus as recited in claim 2 further including wheel means for transporting said housing along the floor surfaces.

8. An apparatus as recited in claim 2 further including means for removably attaching said suction head to said housing, wherein said suction head is removable from said housing in order to clean areas of the floor surfaces.

9. An apparatus as recited in claim 2 further including brush means on said suction head for engaging the floor surfaces in order to promote removal of the contaminant substances therefrom.

10. An apparatus as recited in claim 1 further including trigger means for selectively controlling the forced discharge of the cleaning solution from said at least one spray nozzle.

11. An apparatus as recited in claim 1 further including means for facilitating removal of the separated contaminant substances from said distillation chamber after distillation of said cleaning solution therein.

12. An apparatus as recited in claim 1 further including valve means for controlling fluid flow of said predetermined charge of the cleaning solution from said wash tank to said distillation chamber, said valve means being operable between an open position to permit fluid flow therethrough and a closed position to prevent fluid flow therethrough and to close said distillation chamber during distillation of said predetermined charge of the cleaning solution therein.

13. An apparatus as recited in claim 1 further including means for introducing a cleaning agent into said wash tank for mixture with said predetermined charge of the cleaning solution contained therein.

14. An apparatus for washing floor surfaces with a cleaning solution to remove contaminant substances therefrom, said apparatus comprising:

a housing;

a suction head including an open mouth structured and disposed to be placed in spaced, opposing relation to the floor surfaces during operation of said apparatus when cleaning the floor surfaces and including suction intake means for removing the cleaning solution from the floor surfaces and through said open mouth of said suction head;

at least one spray nozzle for directing a forced discharge of the cleaning solution onto the floor surfaces;

a wash tank for containing a predetermined charge of the cleaning solution therein;

means for introducing a cleaning agent into said wash tank for mixture with said predetermined charge of the cleaning solution contained therein;

means for delivering a pressurized flow of the cleaning solution from said wash tank to said at least one spray nozzle for forced discharge therefrom; and means for distillation of said predetermined charge of the cleaning solution in order to separate and remove the contaminant substances therefrom, after use of the cleaning solution to wash the floor surfaces, thereby yielding purified, non-contaminated cleaning solution for subsequent use during floor washing operations, said means for distillation comprising:

a distillation chamber in fluid flow communication with said wash tank, said distillation chamber being structured and disposed to receive said predetermined charge of the cleaning solution from said wash tank after use of said cleaning solution to wash the floor surfaces; and vacuum means for creating a negative pressure within said distillation chamber to lower the temperature at which the cleaning solution vaporizes.

15. An apparatus as recited in claim 14 wherein said means for distillation of said predetermined charge of the cleaning solution includes means for heating said predetermined charge of the cleaning solution to a temperature sufficient to cause vaporization of the cleaning solution, thereby producing vapors and causing separation of said contaminant substances from the cleaning solution.

16. An apparatus as recited in claim 15 wherein said means for distillation of said predetermined charge of the cleaning solution further includes condenser means for condensing the cleaning solution vapors in order to yield purified, non-contaminated cleaning solution.

17. An apparatus as recited in claim 14 further including trigger means for selectively controlling the forced discharge of the cleaning solution from said at least one spray nozzle.

* * * * *